United States Patent [19]

Hollingsead

[11] 4,124,319
[45] Nov. 7, 1978

[54] SUPPORT PLATE FOR AVIONICS CONNECTOR SHELL

[75] Inventor: Robert A. Hollingsead, La Habra, Calif.

[73] Assignee: Hollingsead Enterprises, Inc., Santa Fe Springs, Calif.

[21] Appl. No.: 865,834

[22] Filed: Dec. 30, 1977

[51] Int. Cl.² .............................................. F16B 1/00
[52] U.S. Cl. ...................................... 403/24; 403/12; 403/262; 339/75 M
[58] Field of Search .................. 403/11, 12, 24, 42, 403/262, 256, 257, 260, 261; 339/75 R, 75 M; 361/391

[56] References Cited

U.S. PATENT DOCUMENTS

| | | | |
|---|---|---|---|
| 2,514,246 | 7/1950 | Knox | 361/391 |
| 2,735,965 | 2/1956 | Balanda | 361/391 |
| 3,977,749 | 8/1976 | Langenbach | 339/75 M |

*Primary Examiner*—Andrew V. Kundrat

*Attorney, Agent, or Firm*—Jackson & Jones Law Corporation

[57] ABSTRACT

A support plate for an electrical connector shell mounted over an opening in the backplate of an avionics rack and panel tray to strengthen the connector shell from bending during insertion of and mating with a removable avionics electronics module. When an avionics module is inserted into the avionics tray, a great deal of force is applied to the connector shell tending to cause it to bend away from the force. This bending is substantially prevented by providing one or more support plates having a transverse plate aligned perpendicularly to the plane of the connector shell. The support plate is mounted on the rear side of the backplate by means of the same bolts used to mount the connector shell. The perpendicular transverse plate has a projection that extends through the opening in the backplate to abut against the rear face of the connector shell midway between its mountings, thereby resisting any rearward bowing or bending of the connector shell.

13 Claims, 4 Drawing Figures

U.S. Patent  Nov. 7, 1978  4,124,319
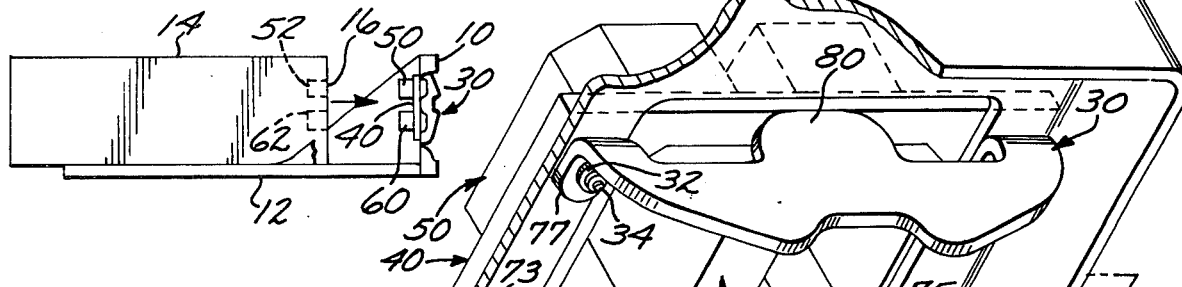
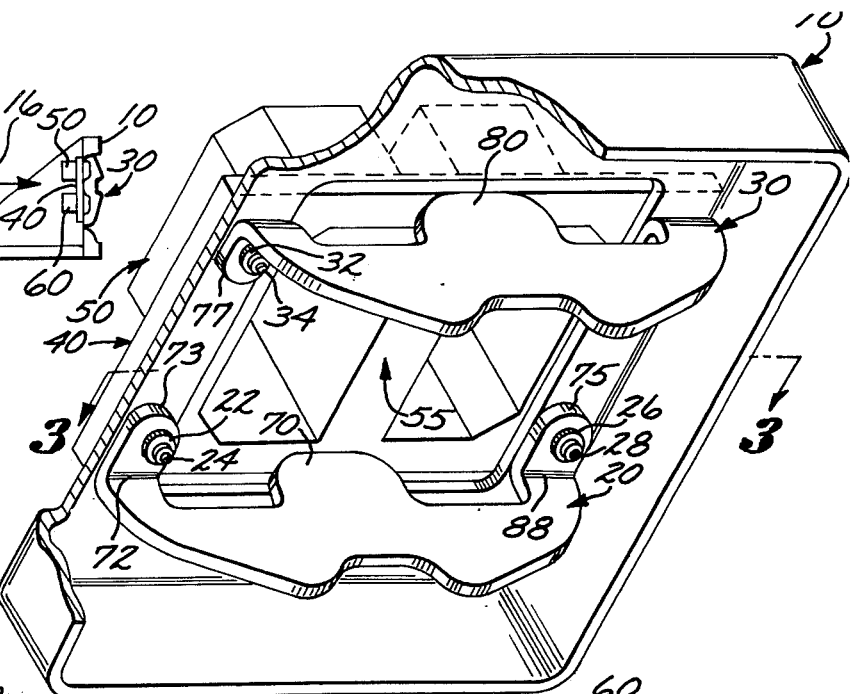
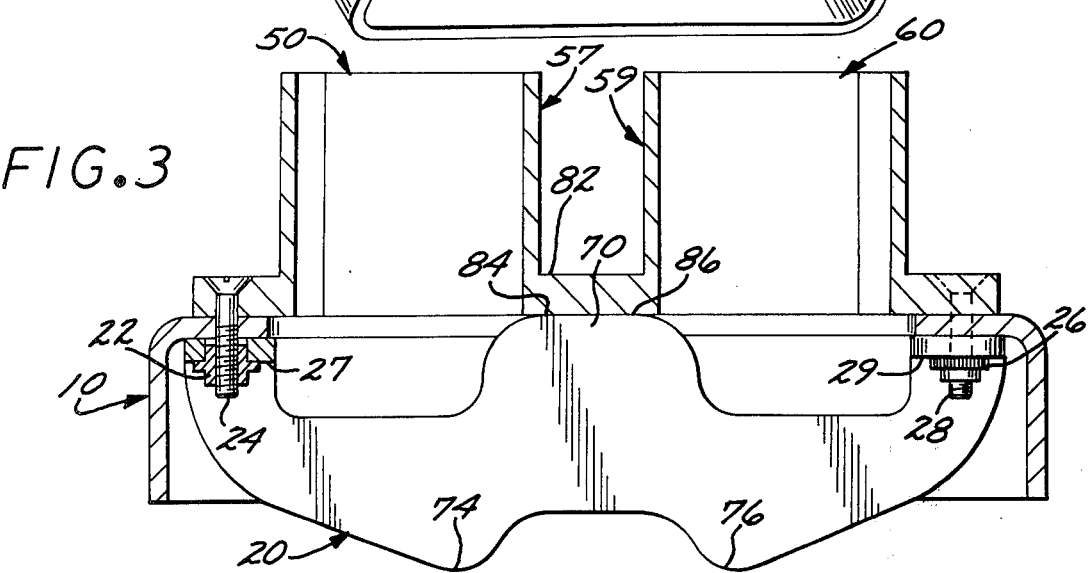
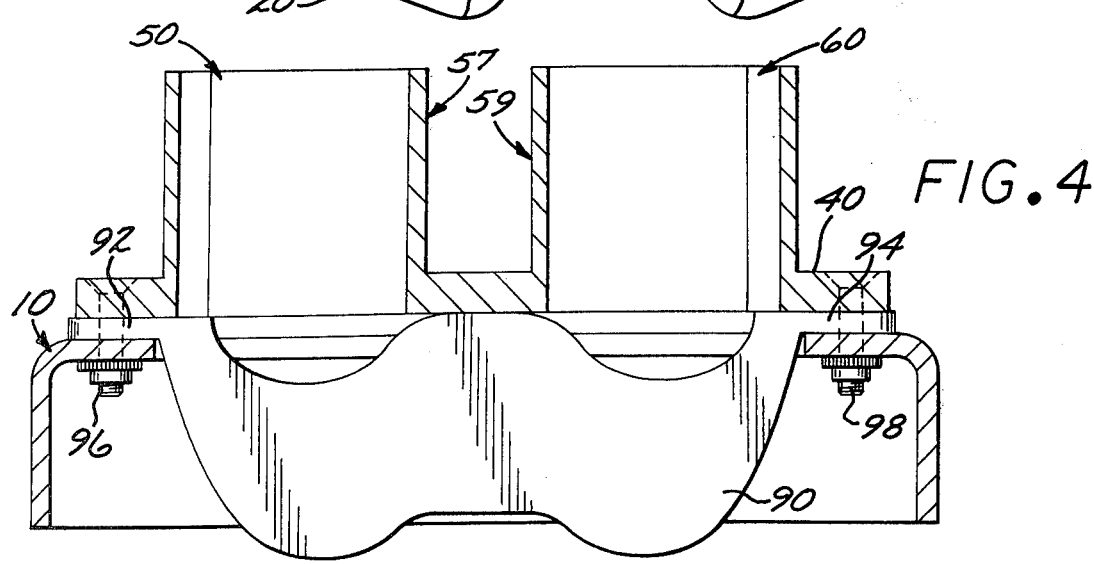

SUPPORT PLATE FOR AVIONICS CONNECTOR SHELL

BACKGROUND OF THE INVENTION

1. Field of the Invention

The present invention relates to racking assemblies for avionic equipment, and more particularly to electrical connectors associated with such racking assemblies.

2. Brief Description of the Prior Art

Modern aircraft require that the avionics system be broken down into subcomponents thereof with these subcomponents housed in modules which can be easily removed from the avionics system and replaced with identical subcomponents. This is required beause the repair of an electronics module can be quite a complex job and can take some time, and the aircraft cannot be allowed to stay idle for the length of time normally necessary to repair the malfunction. When the avionics system malfunctions, it is the common practice to isolate the malfunction down to the module level, remove the malfunctioning module for offsight repair, and replace it immediately with a good module. This allows for a fast turnaround time for the aircraft.

These electronics modules are usually housed in a metal case which can be slideably inserted into a rack and panel assembly or tray located in the avionics bay of an aircraft. Plug-in type electrical connectors are conventionally located on the rear of the module's casing to plug the electronics of the module into the electronics of the avionics system.

With the advent of integrated circuitry and with the increasing complexity and sophistication of avionics systems, these avionics modules are increasingly filled with ever more circuits, requiring a similar increase in the number of electrical interconnections between the module and the tray. These electrical interconnections are conventionally accomplished by means of male plugs which insert into sockets. As each plug/socket combination must mate firmly, there is an inherent resistance to mating. As the total number of plug/socket combinbinations has increased, the cumulative force of resistance to mating of the avionics modules has become quite large.

A conventional rack and panel or tray plug connector, as called for by Aeronautical Radio, Inc. (ARINC) standard 404, has a connector shell bracket in which are mounted two projecting hollow male shells. The male shells house an insulating material in which are mounted a plurality of sockets for reception of the plugs of a corresponding plug connector mounted on the rear of the avionics module. This latter plug connector has a bracket with a pair of recesses for reception of the two male shells. The brackets of the plug connectors are mounted over openings in the rear of the avionics module and the backplate for the avionics tray.

When the avionics module is first inserted into the tray, the male shells of one connector align with the female recesses of the other connector. All the plug/socket pairs also align. When the avionics module is pushed further into the tray, the plug/socket combinations resist mating. A considerable force must be exerted on the avionics module the overcome this resistance. In practice, this force is great enough to cause the tray mounted bracket to bow backwards along a line between the two male shells. This bowing causes the plug/socket pairs to become misaligned. This misalignment further increases the resistance to insertion. If further force is applied to the avionics module, a point will be reached where the bowing is so great that further insertion becomes impossible. In this condition, the avionics module is jambed.

Bowing of the connector bracket results in misalignment of the plug/socket pairs. As a result of an insertion force being applied during such misalignment the plug/socket pairs may become damaged or otherwise separated. This can cause an avionics malfunction due to an open circuit.

The bowing may cause some of the plug/socket pairs to barely mate. During aircraft vibration or shock, certain plug/socket pairs may become temporarily separated causing an intermittent and very difficult to locate avionics malfunction.

OBJECTS AND SUMMARY OF THE INVENTION

Therefore, it is an object of the present invention to provide a light weight brace to prevent the bending or bowing of an electrical connector shell mounted over an opening in the backplate of an avionics tray due to the application of force thereon.

The present invention achieves this object by providing one or more support plates having a transverse plate aligned perpendicularly to the plane of the connector shell. The support plate is mounted on the rear side of the backplate by means of the same bolts used to mount the connector shell. The perpendicular transverse plate has a projection that extends through the opening in the backplate to abut against the rear face of the connector shell midway between its mountings, thereby resisting any rearward bowing or bending of the connector shell.

BRIEF DESCRIPTION OF THE DRAWINGS

Other details and objects of the present invention will become readily apparent following a detailed description of the preferred embodiment when taken in conjunction with the following drawings in which:

FIG. 1 is a plan view of an avionics module and tray.

FIG. 2 is a perspective view of the support plate mounted on the rear of a backplate for an avionics tray.

FIG. 3 is a cross sectional view taken along line 3—3 of FIG. 2.

FIG. 4 is a broken away cross-sectional view showing an alternative embodiment of the present invention.

DESCRIPTION OF THE PREFERRED EMBODIMENT

Referring to FIG. 1, a removable avionics module 14 is shown being inserted into an avionics tray 12. Mounted at the rear of the avionics tray 12 is backplate 10. Upon backplate 10 is mounted a connector shell 40. The connector shell 40 has two male shells 50 and 60 which mate with corresponding recesses 52 and 62 of a plug connector (not shown) mounted on the rear of the avionics module 14.

Mounted within each of the male shells 50 and 60, is an electrical insulator (not shown) in which are mounted a number of sockets (not shown). These sockets are connected to wires (not shown) that lead to the electronics of the avionics system (not shown).

Mounted within each of the recesses 52 and 62 is an electrical insulator (not shown) in which are embedded a number of plugs (not shown) which are designed to plug into corresponding sockets in the shells 50 and 60. These plugs are connected to wires (not shown) which lead to the electronics (not shown) of the avionics module 14.

A support plate 30 is shown behind the partial cutaway of backplate 10. This support plate 30 is mounted on the rear of the backplate 10 by means of the same mounting bolts used to mount the connector shell 40, as will be discussed hereinafter.

As the avionics module 14 is moved rearward against the connector shell 40, the male shells 50 and 60 will begin entering the recesses 52 and 62. As the male plugs of the recesses 52 and 62 begin entering the sockets in the shells 50 and 60, resistance to mating will build up. The force applied to overcome this resistance will tend to force connector shell 40 rearward. Because the connector shell 40 is well buttressed by its structure in the horizontal direction and along the sides of each shell 50 and 60, the connector shell will tend to buckle along the unbuttressed line between shells 50 and 60. If the force applied to overcome the mating resistance is great enough, the connector shell 40 will buckle along this line causing shells 50 and 60 to sag inwards toward each other, thereby increasing the resistance to mating further. If the avionics module 14 is still forced rearwards against this increased resistance, the buckling will increase, perhaps even to the point of jamming. Moreover, the avionics module 14 itself may buckle and assume a bowed shape.

If the aircraft maintenance man inserting the avionics module 14 has cranked the module to what he believes to be the fully inserted position, but due to the buckling of the connector shell 40 is not, the plugs will not be fully mated with the sockets and will also not be properly aligned. Even if an avionics malfunction does not manifest itself immediately, during flight the aircraft will experience vibration and shocks that could cause the improperly mated plugs and sockets to become separated. This intermittent open circuit condition not only could place the aircraft in serious peril, but could also be very difficult to isolate as a source of difficulty during a self-test or other malfunction isolation procedure.

If the resistance to module insertion becomes great enough, various types of mechanical damage can also occur. Plugs can be bent. Sockets can collapse or be forced out of the insulator. The connector shell can be broken. The backplate can be bent or broken.

The present invention overcomes these difficulties by providing a pair of support plates 20 and 30 (FIG. 2), to buttress the connector shell 40 from buckling along the mid-line between the shells 50 and 60. These support plates 20 and 30 are clamped to the rear of backplate 10 via the same bolt and nut combinations used to clamp connector shell 40 to backplate 10. Thus, bolt 24 secured by nut 22 clamps one end of the support plate 20 to the rear of backplate 10 and also clamps one corner of connector shell 40 to the front of backplate 10. Likewise, bolt 28 and nut 26 clamp the other end of support plate 20 to the rear of backplate 10 and also clamps a second corner of connector shell 40 to its front. Bolt 34 and nut 32 clamp one end of support plate 30 to the rear of backplate 10 and clamp a third corner of connector shell 40 to the front of backplate 10. A fourth bolt and nut combination (not shown) clamps the other end of support plate 30 to the back of backplate 10 and also clamps the fourth corner of connector shell 40 to the front of backplate 10.

The nuts are preferably captured by the support plates. Thus, nuts 22 and 26 are captured by support plate 20, as is nut 32 of support plate 30.

These support plates 20 and 30 are preferably made of aluminum sheet metal or may be made of the same lightweight metal as backplate 10, as long as the material provides strength without heaviness. The support plates 20 and 30 may be from a metal sheet having the same order of thickness as backplate 10. Thus, the entire backplate assembly comprises a relatively light structure, such as is necessary in aircraft applications.

The central projections 70 and 80 of support plates 30 and 20 respectively, abut against connector shell 40. As can be seen in FIG. 3, support plate 20 abuts against the rear of connector shell 40 from a point 84 to a point 86 of projection 80. The distance between points 84 and 86 is approximately the same as the width of the central supporting column 82 of connector shell 40. The width of the supporting column 82 of connector shell 40 is the distance between the shell wall 57 of shell 50 and shell wall 59 of shell 60. These central projections 70 and 80 of support plates 20 and 30 are so positioned that the vector sum of their forces of resistance to the bending or buckling of connector shell 40 lies approximately between them at point 55 (FIG. 2), which is the center of effort of the forces applied on the connector shell through shells 50 and 60.

The line of abutment between points 84 and 86 can be made narrower if desired. However, if the line is made too narrow, the forces applied on the support plate 20 will at some point overcome the strength of the materials from which support plate 20 is made and will cause the abutting portion of the support plate 20 to collapse. However, it is not necessary to make the abutting portion of support plate 20 so broad as to cover the entire distance of surface of the connector shell 40 exposed to support plate 20. Assuming that support plate 20 and support plate 30 are identically mounted, no matter how broad the abutting portion is, the vector sum of the force of resistance due to support plate 20 and support plate 30 will be at point 55. Therefore, any excessive width in the central projection 80 unnecessarily adds to the weight of the support plate without contributing to a proportional increase in structural strength or resistive power. Thus, the dimensions of the projections 70 and 80 of support plates 20 and 30 can be determined by the strength of the materials composing the support plates.

The resultant shape of a given support plate 20, as shown in FIG. 3, is substantially that of an arch which has an inverse arch at its apex to form the projection 70 that abuts the surface of the connector shell 40. This construction is designed to transmit the stress places on projection 70 to the points of suspension 27 and 29 of the support plate 20 along a natural line, eliminating to a great extent the so-called neutral fibers, those fibers that experience no stress and thus add to structural weight without contributing to structural strength. The force incident on connector shell 40 would be transmitted through the inverse arch, substantially projection 70, to the inverse arch's impost points 74 and 76; then from these points on a line up to suspension points 27 and 29. Because the stress is transmitted through the support plate in a defined pattern, those parts of the support plate 20 unnecessary to this pattern have been eliminated from the support plate, thus saving weight.

Because the force incident upon support plate 20 is at right angles to connector shell 40, the inverse arch or projection 70 of support plate 20 resisting this force must also lie at right angles to the connector shell 40 in order to avoid a moment of torque upon the support plate not naturally resisted by its structure. Thus the line formed by connecting points 72 and 88 in FIG. 2 and the line formed by connecting parts 74, 84, 86 and 76 (FIG. 3), all lie in a single plane which is at right angles to connector shell 40. At point 72 in FIG. 2, the support plate 20 is bent so that the flange section 73 of support plate 20 is parallel to the backplate 10 for operable reception of bolt 24 through a hole (not shown) in the flange section 73. The other flange section 75 of support plate 20 is likewise bent into a plane parallel to backplate 10 for the reception of bolt 28. Support plate 30 has similar flanges, flange section 77 and a flange section on its other leg (not shown).

An alternative embodiment is shown in FIG. 4. In this embodiment, an alternate preferred support plate 90 is foreshortened to allow its flange sections 92 and 94 to project through the opening in backplate 10 to couple directly to the rear of the connector shell 40. The flange sections 92 and 94 can be mounted with the same bolt and nut combinations 96 and 98 as used to mount connector shell 40, or they can be welded directly to the rear of connector shell 40 for easier assembly.

This completes the description of the preferred embodiment. Nothing in this description should be taken as limiting the scope of the invention hereinafter claimed. The generic principles of this invention can be practiced in many equivalent applications where a given member or bracket is desired to be strengthened against bending or bowing without the addition of an undue amount of weight to the member.

Therefore in light of the detailed description of the preferred embodiment, I claim:

1. An apparatus to support the rear portion of a connector shell secured over an opening in the backplate of an avionics tray, wherein the connector shell defines mounting holes in the top and bottom of the shell which are arranged to receive mounting bolts for securing the shell to one side of the backplate, the apparatus including a first support plate comprising:
   a pair of spaced co-planar flange sections located at each end of the support plate, the flange sections defining mounting holes therein adapted to align with one of the top and bottom mounting holes in the connector shell, the flange sections being further arranged to be secured to the other side of the backplate; and
   an intermediate section extending between the flange sections and aligned in a plane perpendicular to the plane passing through the flange sections, the intermediate section including a connector shell engaging portion which extends beyond the plane passing through the flange sections centrally of the support plate for abutting a surface of the connector shell midway between the mounting holes therein when the connector shell and support plate are secured on opposite sides of the backplate, whereby the support plate will resist movement of the central portion of the connector shell toward the plane passing through the flange sections.

2. The apparatus of claim 1 wherein the intermediate section of said first support plate is shaped substantially like an arch having an inverse arch formed at its apex.

3. The apparatus of claim 1 wherein said first support plate is formed as a single unit.

4. The apparatus of claim 3 wherein said first support plate is formed from aluminum sheet metal.

5. The apparatus of claim 1 wherein said first support plate includes a nut captured by the flange sections of the support plate at the mounting holes to receive the mounting bolts.

6. The apparatus of claim 1 wherein said first support plate is secured to the backplate at a top and bottom mounting hole located at one side of the connector shell, and further including a second support plate comprising:
   a pair of spaced co-planar flange sections located at each end of the support plate, the flange section defining mounting holes therein adapted to align with one of the top and bottom mounting holes in the connector shell, said flange section being secured to the other side of the backplate at a top and bottom mounting hole located at the other side of the connector shell; and
   an intermediate section extending between the flange sections and aligned in a plane perpendicular to the plane passing through the flange sections, the intermediate section including a connector shell engaging portion which extends beyond the plane passing through the flange sections centrally of the support plate for abutting a surface of the connector shell midway between the mounting holes therein when the connector shell and support plate are secured on opposite sides of the backplate, whereby the support plate will resist movement of the central portion of the connector shell toward the plane passing through the flange sections.

7. The apparatus of claim 6 wherein the intermediate section of said second support plate is shaped substantially like an arch having an inverse arch formed at its apex.

8. The apparatus of claim 6 wherein said second support plate is formed as a single unit.

9. The apparatus of claim 1 wherein the pair of spaced co-planar flange sections of said first support plate extend from said support plate on one side thereof.

10. A support plate for supporting the rear portion of a connector shell secured over an opening in the backplate of an avionics tray wherein the connector shell has mounting holes along its top and bottom periphery for securing the shell to one side of the backplate, said support plate comprising:
    a body section shaped substantially like a flat arch wherein the greatest surface area thereof lies in a first plane, said body section having the material at is apex cut away and having a flat projection lying in the first plane extending from the underside of the arch at the cutaway apex; and
    a pair of flange sections, one at each end of the body section, each flange lying in a second plane perpendicular to the first plane.

11. The support plate of claim 10 wherein each flange section is formed by bending the ends of said arched body section opposite the cutaway apex at right angles to said first plane so that the flange sections lie in a second plane perpendicular to said first plane at a point below the furthest extension of the flat projection of said body section.

12. The support plate of claim 11 wherein each flange section has an aperture therethrough for accepting a mounting bolt.

13. The support plate of claim 12 further comprising a nut captured by each flange section at its aperture for receiving a mounting bolt.

* * * * *

UNITED STATES PATENT OFFICE
CERTIFICATE OF CORRECTION

Patent No. 4,124,319            Dated November 7, 1978

Inventor(s) Robert A. Hollingsead

It is certified that error appears in the above-identified patent and that said Letters Patent are hereby corrected as shown below:

Column 5, line 35, after "apparatus" should read -- adapted --.

Signed and Sealed this

Tenth Day of April 1979

[SEAL]

Attest:

RUTH C. MASON
*Attesting Officer*

DONALD W. BANNER
*Commissioner of Patents and Trademarks*